US010465838B2

(12) United States Patent
Lin (10) Patent No.: US 10,465,838 B2
(45) Date of Patent: Nov. 5, 2019

(54) TRIPOD WITH CONNECTING COMPONENTS (71) Applicant: Chien-Ting Lin, Taipei (TW)

(72) Inventor: Chien-Ting Lin, Taipei (TW)

( * ) Notice: Subject to any disclaimer, the term of this patent is extended or adjusted under 35 U.S.C. 154(b) by 0 days.

(21) Appl. No.: 15/355,575

(22) Filed: Nov. 18, 2016

(65) Prior Publication Data

US 2018/0010732 A1 Jan. 11, 2018

(30) Foreign Application Priority Data

Jul. 6, 2016 (CN) ...................... 2016 2 0705921 U (51) Int. Cl.
*F16M 11/34* (2006.01)
*G03B 17/56* (2006.01)
*F16M 11/04* (2006.01)

(52) U.S. Cl.
CPC ........... *F16M 11/34* (2013.01); *F16M 11/046* (2013.01); *G03B 17/561* (2013.01)

(58) Field of Classification Search
CPC ..... F16M 11/34; F16M 11/046; G03B 17/561
USPC ......................................................... 248/157
See application file for complete search history.

(56) References Cited

U.S. PATENT DOCUMENTS

| 1,234,510 | A | * | 7/1917 | Trautwein | F16M 11/28 |
| | | | | | 182/153 |
| 1,639,846 | A | * | 8/1927 | Green | F41A 23/12 |
| | | | | | 248/171 |
| 1,886,198 | A | * | 11/1932 | Krueger | A01G 17/04 |
| | | | | | 248/524 |
| 2,282,285 | A | * | 5/1942 | Olson | F16M 11/046 |
| | | | | | 16/24 |
| 2,323,473 | A | * | 7/1943 | Korling | F16M 11/10 |
| | | | | | 248/183.1 |
| 2,588,399 | A | * | 3/1952 | McQuin | E04G 1/34 |
| | | | | | 182/20 |
| 2,702,727 | A | * | 2/1955 | Sweet | B25H 1/06 |
| | | | | | 182/153 |
| 2,770,229 | A | * | 11/1956 | Tarcici | F24S 20/30 |
| | | | | | 126/681 |
| 3,314,655 | A | * | 4/1967 | Steele | B66F 3/10 |
| | | | | | 254/102 |
| 3,417,952 | A | * | 12/1968 | Bieschke | G03B 21/58 |
| | | | | | 248/171 |

(Continued)

Primary Examiner — Anita M King
(74) Attorney, Agent, or Firm — WPAT, PC (57) ABSTRACT Disclosed is a tripod. The tripod comprises a base body, a plurality of tripod tubes and a plurality of connecting components. An end of each tripod tube is pivotally connected to the base body. The plurality of tripod tubes is pivotally operated in relation to the base body either at a folded state or at an expanding state. The other end of the plurality of tripod tubes get being close to each other so as to be folded in the folded state, and the other end of the plurality of tripod tubes get being far from each other so as to be expanding in the expanding state. Each of the plurality of connecting components is pivotally connected between the tripod tubes adjacent to each other. the two connecting elements are pulled by the tripod tubes connected to the two connecting elements in such a manner that the connecting elements are pulled by each other to be a straight line so as to provide a steady force to support the adjacent tripod tubes and thus to provide stable supporting force for a photographic equipment.

14 Claims, 9 Drawing Sheets (56) References Cited

U.S. PATENT DOCUMENTS

| | | | | |
|---|---|---|---|---|
| 4,223,860 A | * | 9/1980 | Prest | A47B 13/06 |
| | | | | 108/150 |
| 5,934,628 A | * | 8/1999 | Bosnakovic | B60Q 7/00 |
| | | | | 248/169 |
| 2012/0001038 A1 | * | 1/2012 | Lin | F16M 11/242 |
| | | | | 248/171 |

* cited by examiner

TRIPOD WITH CONNECTING COMPONENTS

FIELD OF THE INVENTION

The present invention relates to a tripod, and more particularly relates to a tripod with connecting components.

BACKGROUND OF THE INVENTION

With the popularity of cameras, there are more and more photography enthusiasts and professional photographers as well. For these photographers who take photos of outdoor scenes such as flowers, animals or nightscapes, they usually require to use tripods with extended legs for taking photos of these objects from high visual angles. However, it happens that a tripod loses balance easily when the extended legs are to be extended or when large photographic equipment is supported by the tripod, thereby causing a risk of photographic equipment to be damaged.

In order to prevent a tripod from being collapsed or from being shook caused by unstable center of gravity of the tripod, in conventional arts, a tripod needs to install a fixing device for supporting purposes, where the fixing device is usually installed at a position near the bottom of a tripod so as to keep the tripod legs steadily opening in their most degree such that the tripod can stably stand on the ground. However, the fixing device is heavy and inconvenient for carrying. Furthermore, there is some other drawback for the prior tripod that the fixing device needs to be installed and dismantled through some complicate processes before and after each usage. Therefore, it is necessary to improve the conventional tripods.

SUMMARY OF THE INVENTION

Therefore, the purpose of the present invention is to provide a tripod with connecting components that improve usability.

The technical means adopted by the present invention to overcome the drawbacks in prior art provides a tripod with connecting components comprising: a base body; a plurality of tripod tubes, an end of each tripod tube being pivotally connected to the base body, the plurality of tripod tubes being pivotally operated in relation to the base body either at a folded state or at an expanding state, wherein the other end of the plurality of tripod tubes get being close to each other so as to be folded in the folded state, and the other end of the plurality of tripod tubes get being far from each other so as to be expanding in the expanding state; and a plurality of connecting components, each of the plurality of connecting components being pivotally connected between the tripod tubes adjacent to each other, each of the connecting components being composed of two connecting elements having two inner ends connected each other pivotally via a first screw and two outer end connected pivotally to their respective tripod tubes via a second screw such that the connecting elements which can be folded and expanded, wherein in the expanding state, the two connecting elements are pulled by the tripod tubes connected to the two connecting elements in such a manner that the connecting elements are pulled by each other to be a straight line so as to provide a steady force to support the adjacent tripod tubes, and in the folded state, the connecting elements are folded between the adjacent tripod tubes connected to the connecting elements after being driven by the tripod tubes connected to the connecting elements.

According to a preferred embodiment of the present invention, the tripod with connecting components further comprises a central tube, which is able to slidably pass through the base body.

According to a preferred embodiment of the present invention, the tripod with connecting components further comprises a plurality of supporting components, one end of each supporting component is pivotally connected to the central tube, and the other end of said each supporting component is pivotally connected to the tripod tube, wherein when the central tube is slid relative to the base body in the expanding state, the each supporting component laterally supports the central tubes and the tripod tubes, and when the central tube is slid relative to the base body in the folded state, the supporting component is folded as being get close to the tripod tube which is pivotally connected with the supporting component.

According to a preferred embodiment of the present invention, the central tube and the supporting component are pivotally connected by a pivotal connecting element.

According to a preferred embodiment of the present invention, the connecting component is connected to the tripod tube by a fixing element.

According to a preferred embodiment of the present invention, the connecting component and the supporting component are connected to the tripod tube by a fixing element.

According to a preferred embodiment of the present invention, the tripod with connecting components further comprises a central tube, a sliding component and a plurality of guiding components, the central tube is connected with the base body, the sliding component is slidably sleeved by the central tube, and each guiding component is pivotally connected between the sliding component and the tripod tube.

According to a preferred embodiment of the present invention, the tripod tube includes a supporting tube and a sliding tube, the supporting tube is provided with two longitude elements and one lateral connecting element connected to one end of the each longitude elements and situated between the two longitude elements, the lateral connecting element is connected with the base body, and the sliding tube is slidably connected between the two longitude elements by a sleeving element.

According to a preferred embodiment of the present invention, the tripod tube is a telescopic tube.

According to a preferred embodiment of the present invention, the central tube is a telescopic tube.

By the technical means of the present invention, the plurality of connecting components is pivotally connected between the tripod tubes adjacent to each other such that the relative position between the tripod tubes adjacent to each other are ensured thereby enabling the tripod tubes to be less susceptible to the shaking from external forces to thus improve the stability of the tripod. Moreover, the present invention reliefs the need of complicate assembly and disassembly of the extended legs since two connecting elements of each connecting component are driven by the tripod tubes to fold or expand between the adjacent tripod tubes. Therefore, the usability of the tripod is improved as compared to the conventional tripod which requires a process of assembly and disassembly for fixing proposes.

DETAILED DESCRIPTION OF THE PREFERRED EMBODIMENTS

The implementation of the present invention is described as follows with reference to FIGS. 1 to 9. The descriptions herein are not to be construed as limitations on the present invention, but are to be construed as illustration of the preferred embodiments of the present invention.

Figure 1:
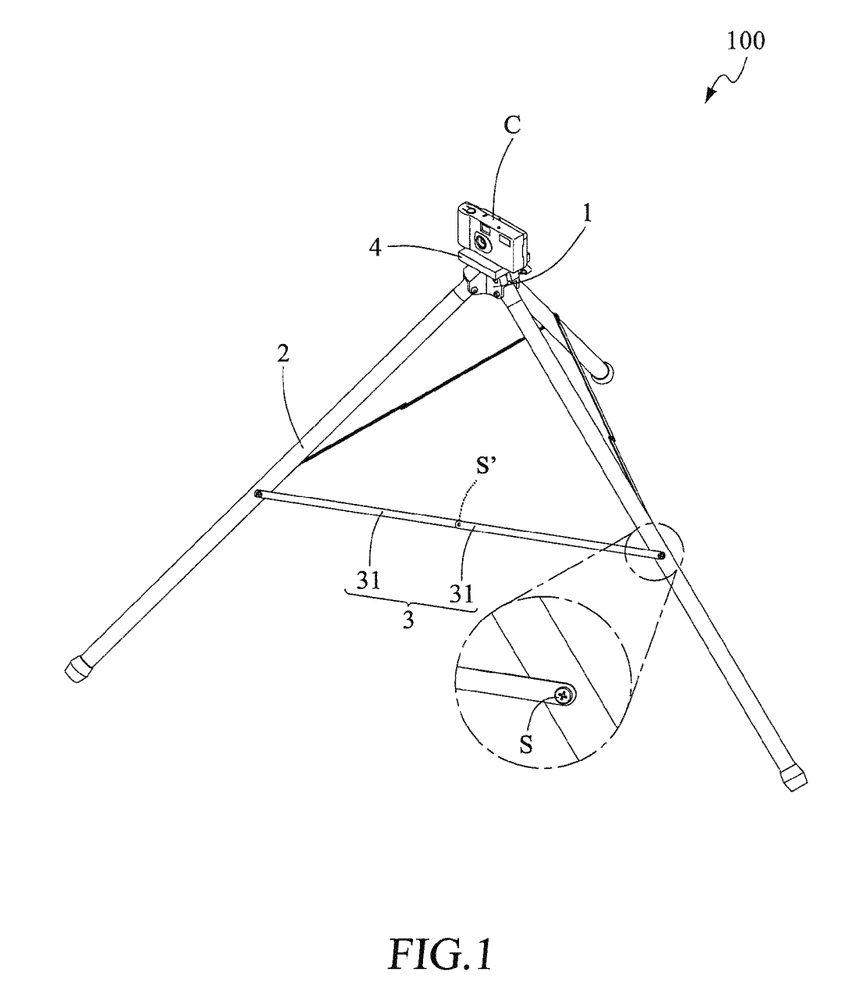
FIG. 1 is a perspective view illustrating a tripod in an expanding state according to the first embodiment of the present invention.

Please refer to FIG. 1. According to the first embodiment of the present invention, a tripod 100 comprises a base body 1, a plurality of tripod tubes 2 and a plurality of connecting components 3.

Figure 2:
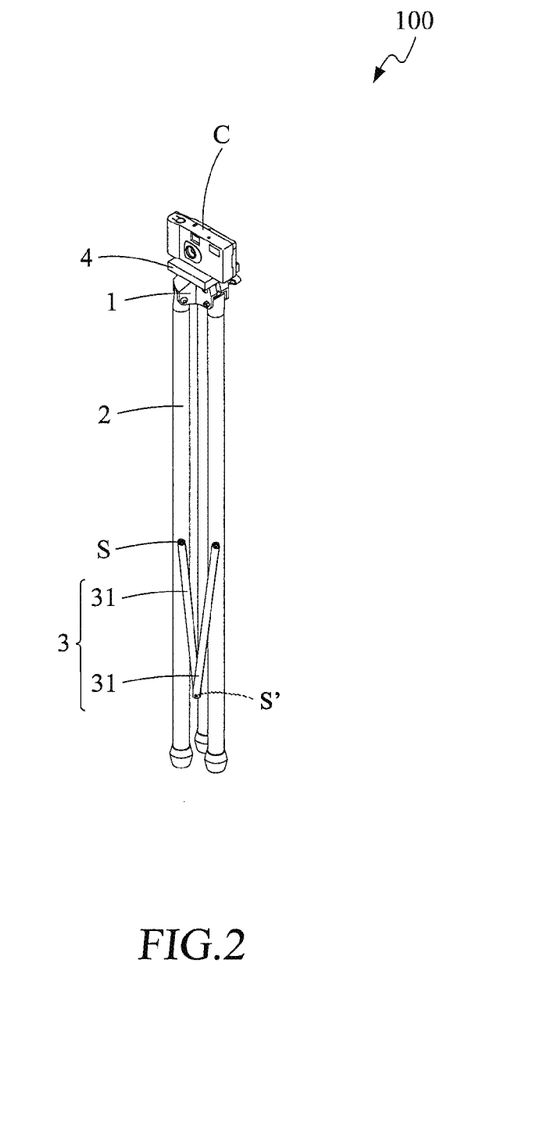
FIG. 2 is a perspective view illustrating the tripod in a folded state according to the first embodiment of the present invention.

Please refer to FIGS. 1 and 2. An end of each tripod tube 2 is pivotally connected to the base body 1. The plurality of tripod tubes 2 is pivotally operated in relation to the base body 1 either at a folded state (as shown in FIG. 2) or at an expanding state (as shown in FIG. 1). The other end of the plurality of tripod tubes 2 get being close to each other so as to be folded in the folded state, and the other end of the plurality of tripod tubes 2 get being far from each other so as to be expanding in the expanding state. Preferably, the tripod tube 2 is a telescopic tube.

Please refer to FIGS. 1 and 2. Each of the plurality of connecting components 3 is pivotally connected between the tripod tubes 2 adjacent to each other. In the first embodiment, both ends of the connecting component 3 are respectively connected to the tripod tube 2 by a screw S. To be more specific, each of the connecting components 3 is composed of two connecting elements 31 having two inner ends connected each other pivotally via a first screw S' (see FIG. 1) and two outer ends connected pivotally to their respective tripod tubes via a second screw S (see FIG. 1). In addition, the present invention is not limited to this. Please refer to FIGS. 3 and 4. In a tripod 100a according to a second embodiment of the present invention, each of the plurality of connecting components 3 is connected to the tripod tubes 2 by fixing elements S1.

Please refer to FIGS. 1 and 2. Each of the connecting components 3 is composed of two connecting elements 31 which can be folded and expanded. In the expanding state, the two connecting elements 31 are pulled by the tripod tubes 2 connected to the two connecting elements 31 in such a manner that the connecting elements 31 are pulled by each other to be a straight line so as to provide a steady force to support the adjacent tripod tubes 2. In addition, the present invention is not limited to this. The two connecting elements 31 are pulled to be a straight by hand-assisted.

Please refer to FIG. 2. The two connecting elements 31 are folded between the adjacent tripod tubes 2 connected to the connecting elements 31 after being driven by the tripod tubes 2 connected to the connecting elements 31. In addition, the present invention is not limited to this. The two connecting elements 31 are folded between the adjacent tripod tubes 2 connected to the connecting elements 31 by hand-assisted.

Preferably, the tripod 100 further comprises a cradle head 4. The cradle head 4 is provided on the base body 1 for carrying a photographic equipment C.

Other structures of the tripod according to the present invention are described in the following embodiments. The tripods of the following embodiments and the tripod 100 are roughly the same according to the present invention. The similar details of the embodiment will thus be omitted herein.

Figure 3:
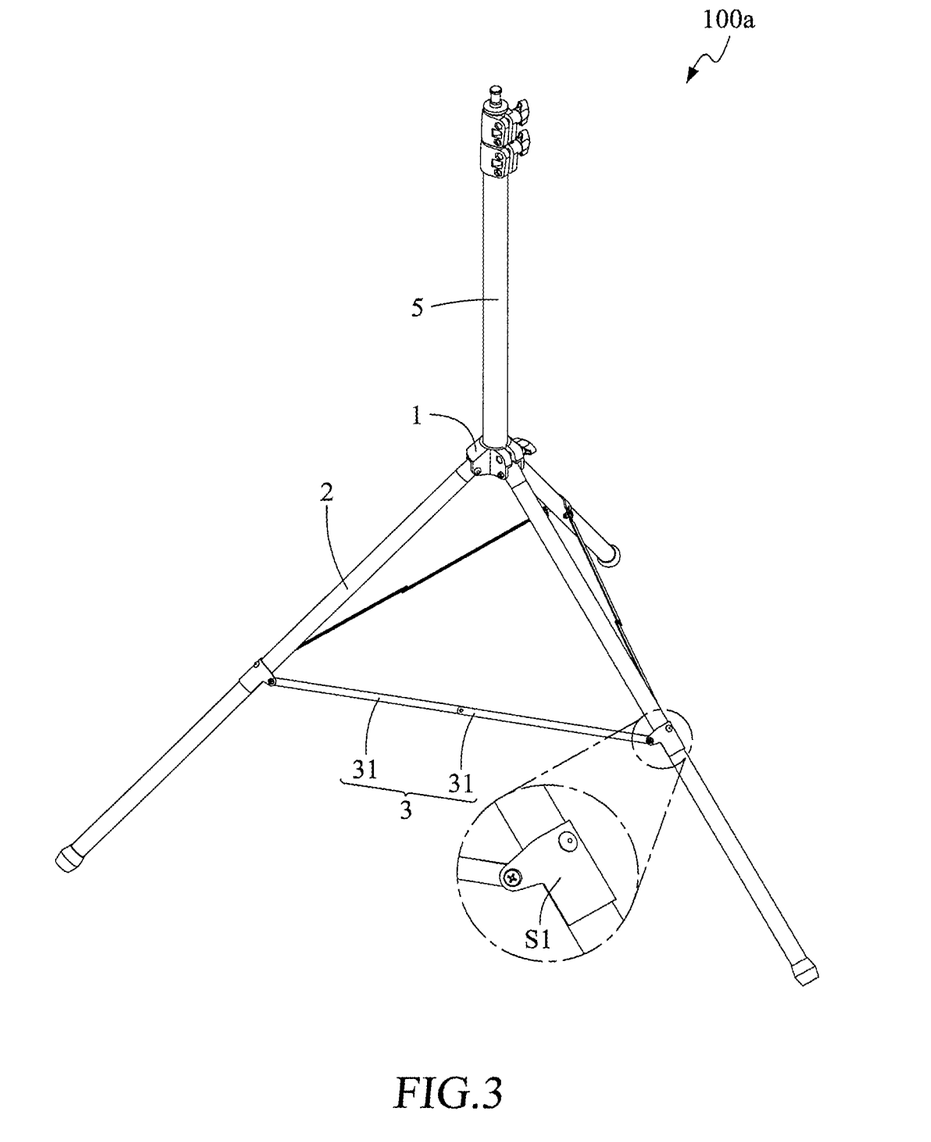
FIG. 3 is a perspective view illustrating a tripod in the expanding state according to a second embodiment of the present invention.
Figure 4:
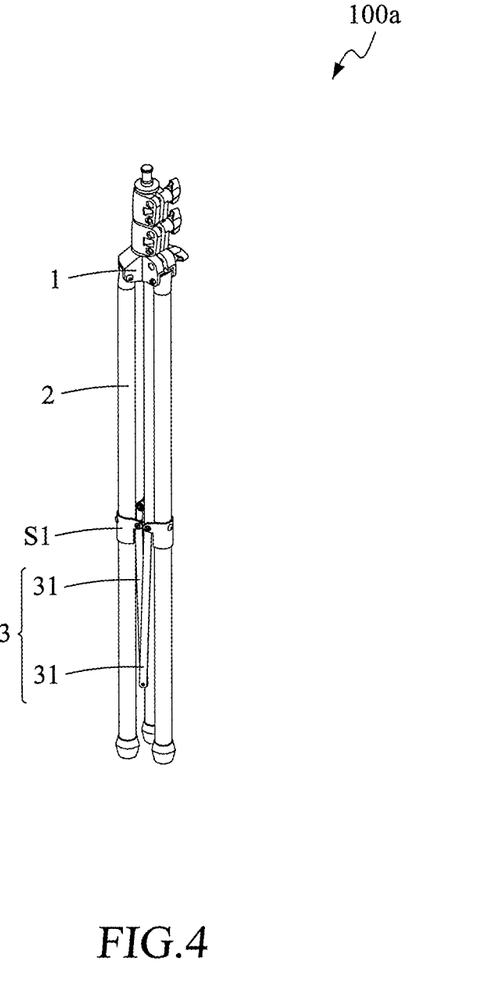
FIG. 4 is a perspective view illustrating the tripod in the folded state according to the second embodiment of the present invention.

Please refer to FIGS. 3 and 4. The difference between the tripod 100a according to a second embodiment and the tripod 100 according to the first embodiment of the present invention is that the tripod 100a further comprises a central tube 5, which is able to slidably pass through the base body 1. Preferably, the central tube 5 is a telescopic tube.

Figure 5:
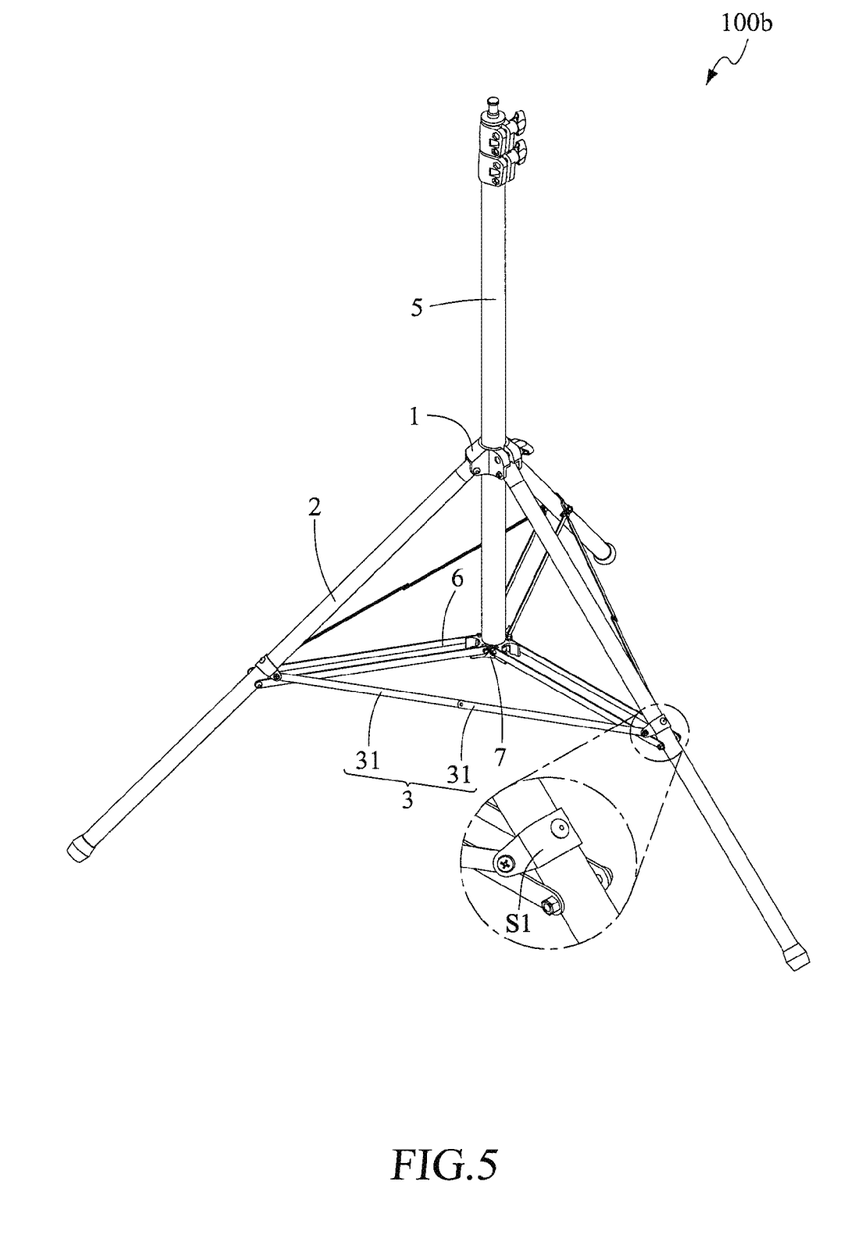
FIG. 5 is a perspective view illustrating a tripod in the expanding state according to a third embodiment of the present invention.
Figure 6:
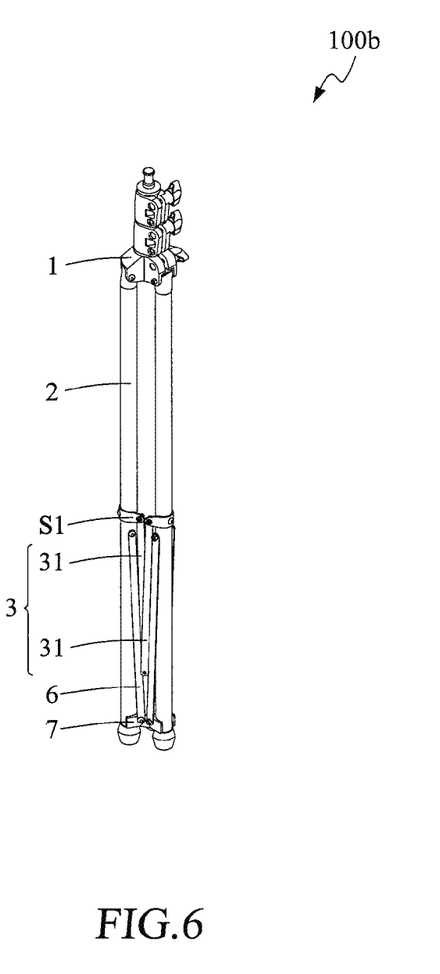
FIG. 6 is a perspective view illustrating the tripod in the folded state according to the third embodiment of the present invention.

Please refer to FIGS. 5 and 6. The difference between the tripod 100b according to a third embodiment and the tripod 100a according to the second embodiment of the present invention is that the tripod 100b further comprises a plurality of supporting components 6, one end of each supporting component 6 is pivotally connected to the central tube 5, and the other end of said each supporting component 6 is pivotally connected to the tripod tube 2, wherein when the central tube 5 is slid relative to the base body 1 in the expanding state (as shown in FIG. 5), the each supporting component 6 laterally supports the central tubes 5 and the tripod tubes 2, and when the central tube is slid relative to the base body 1 in the folded state (as shown in FIG. 6), the supporting component 6 is folded as being get close to the tripod tube 2 which is pivotally connected with the supporting component 6.

Preferably, the central tube 5 and the supporting component 6 are pivotally connected together by a pivotal connecting element 7.

Figure 7:
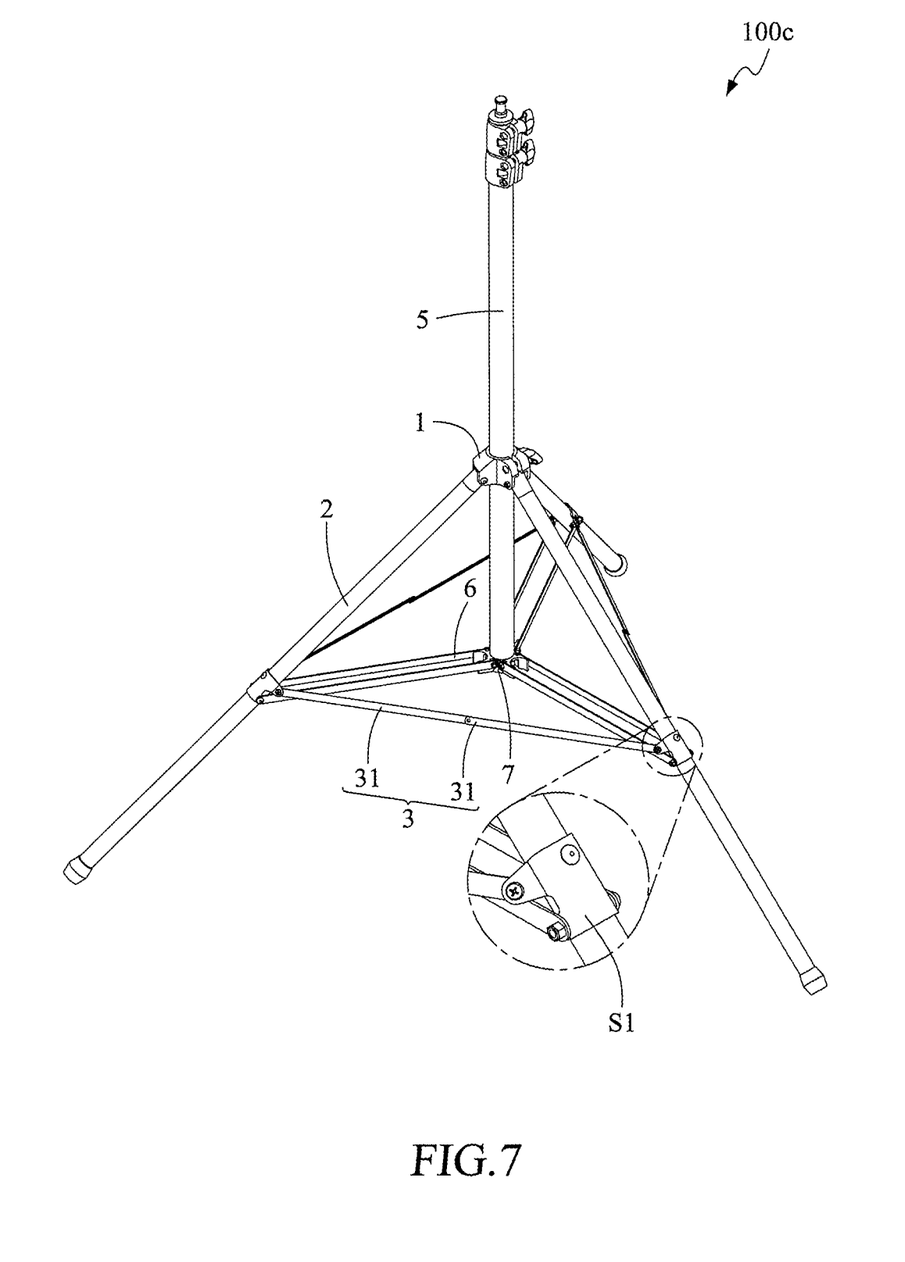
FIG. 7 is a perspective view illustrating a tripod in the expanding state according to a fourth embodiment of the present invention.

Please refer to FIG. 7. The difference between the tripod 100c according to a fourth embodiment and the tripod 100 according to the first embodiment of the present invention is that the connecting component 3 and the supporting component 6 are connected to the tripod tube by a fixing element S1.

Figure 8:
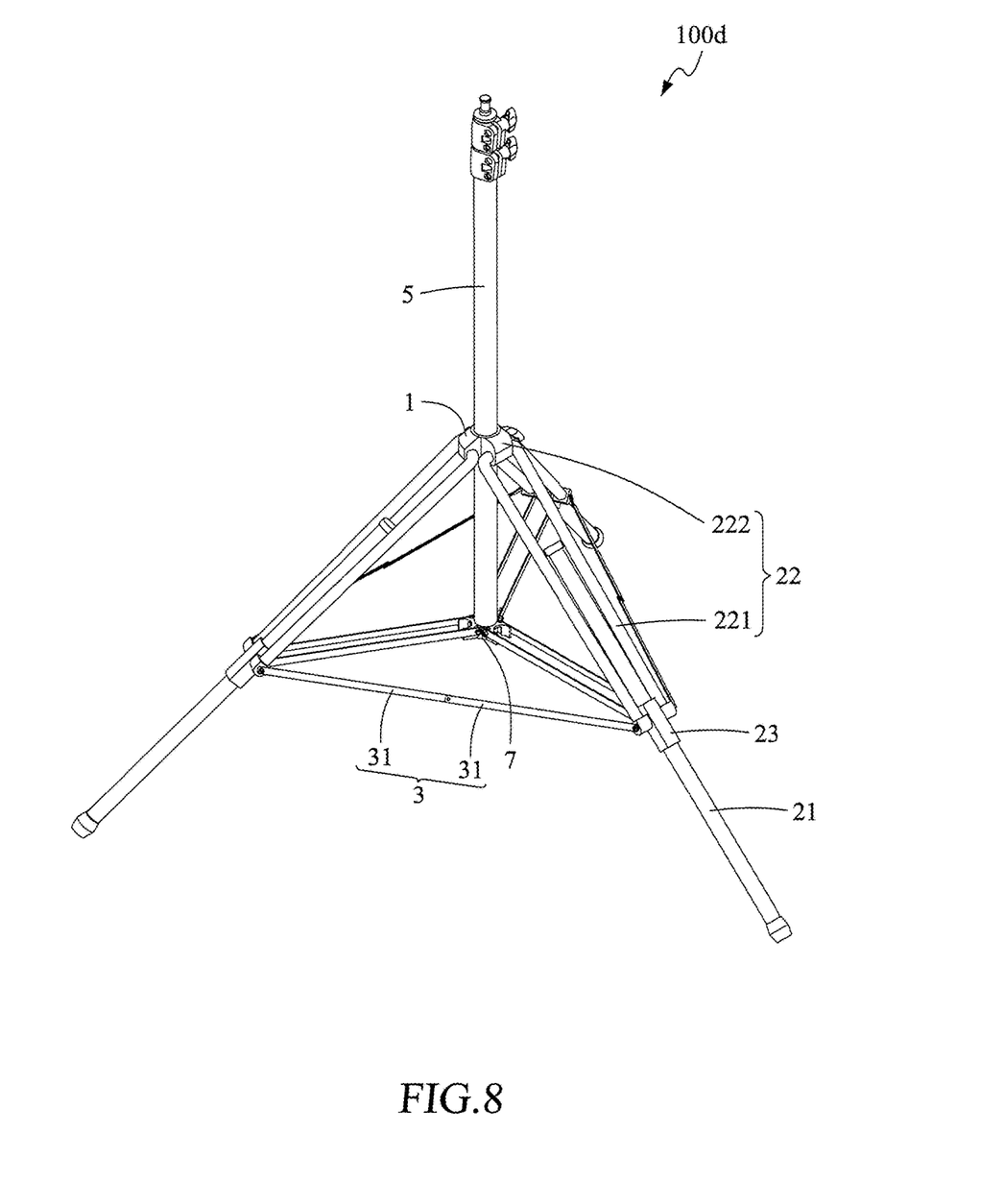
FIG. 8 is a perspective view illustrating a tripod in the expanding state according to a fifth embodiment of the present invention.

Please refer to FIG. 8. The difference between the tripod 100d according to a fifth embodiment and the tripod 100c according to the fourth embodiment of the present invention is that the tripod tube 2 includes a supporting tube 22 and a sliding tube 21. The supporting tube 22 is provided with two longitude elements 221 and one lateral connecting element 222 connected to one end of the two longitude elements 221. The lateral connecting element 222 is connected with the base body 1. The sliding tube 21 is slidably connected between the two longitude elements 221 by a sleeving element 23.

Figure 9:
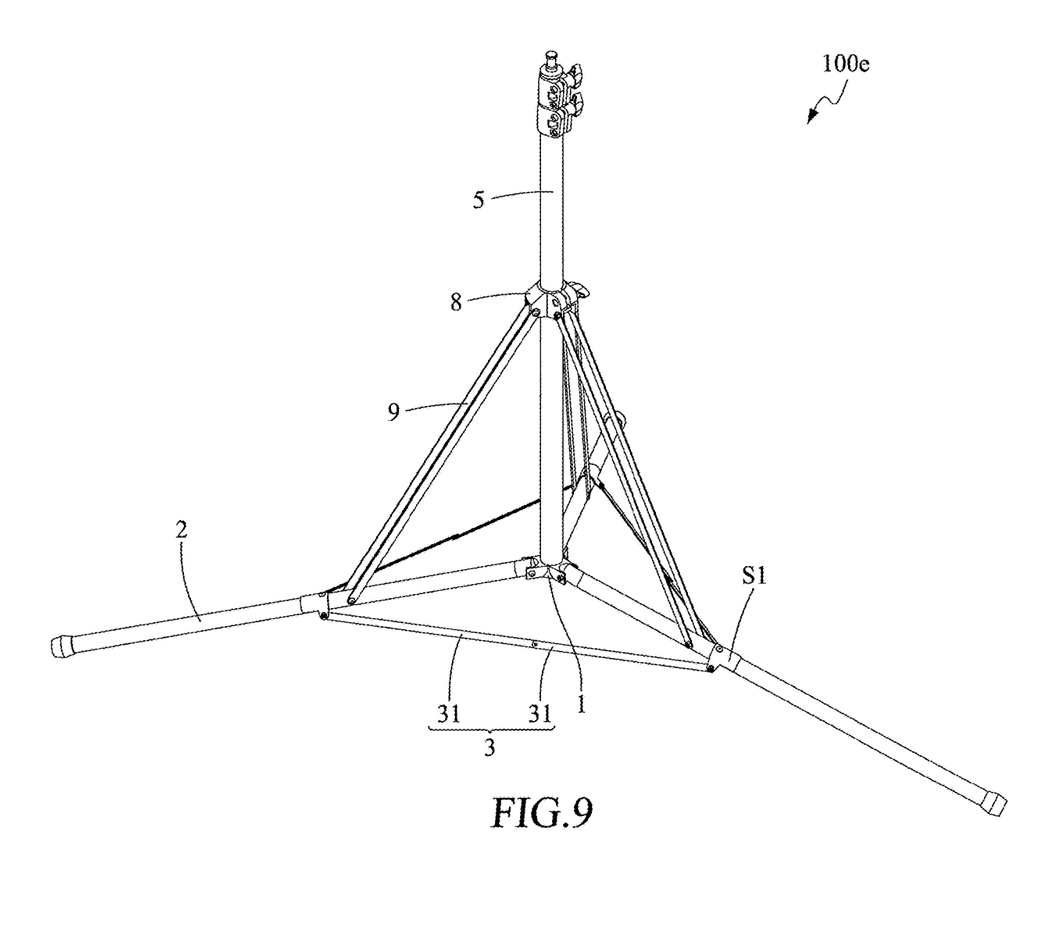
FIG. 9 is a perspective view illustrating a tripod in the expanding state according to a sixth embodiment of the present invention.

Please refer to FIG. 9. The difference between the tripod 100e according to a sixth embodiment and the tripod 100b according to the third embodiment of the present invention is that the tripod 100*e* further comprising a central tube, a sliding component 8 and a plurality of guiding components 9. The central tube is connected with the base body 1. The sliding component 8 is slidably sleeved by the central tube 5. Each guiding component 9 is pivotally connected between the sliding component 8 and the tripod tube 2.

The above description should be considered as only the preferred embodiments of the present invention, and the scope of the embodiment of present invention is not limited thereto. Various equivalents and modifications without departing from the appended claims and the description of present invention are included in the scope of the present invention.

What is claimed is:

1. A tripod, comprising:
   a base body;
   a plurality of tripod tubes, an end of each tripod tube being pivotally connected to the base body, the plurality of tripod tubes being pivotally operated in relation to the base body either at a folded state or at an expanding state, wherein the other end of the plurality of tripod tubes get-being close to each other so as to be folded in the folded state, and the other end of the plurality of tripod tubes get-being far from each other so as to be expanded in the expanding state; and
   a plurality of connecting components, wherein each of the plurality of connecting components is pivotally connected between the tripod tubes adjacent to each other, each of the connecting components is composed of two connecting elements having two inner ends connected each other pivotally via a first screw and two outer ends connected pivotally to their respective tripod tubes via a second screw such that the connecting elements can be folded and expanded;
   wherein, in the expanding state, the two connecting elements are pulled directly by the tripod tubes connected to the two connecting elements in such a manner that the connecting elements are pulled to be a straight line for providing a steady force to support the adjacent tripod tubes, and in the folded state, the connecting elements are folded between the adjacent tripod tubes connected to the connecting elements after being pushed directly by the tripod tubes connected to the connecting elements.

2. The tripod as claimed in claim 1, further comprising a central tube, which is able to slidably pass through the base body.

3. The tripod as claimed in claim 2, wherein the central tube is a telescopic tube.

4. The tripod as claimed in claim 2, further comprising a plurality of supporting components, one end of each supporting component is pivotally connected to the central tube, and the other end of said each supporting component is pivotally connected to the tripod tube, wherein when the central tube is slid relative to the base body in the expanding state, the each supporting component laterally supports the central tubes and the tripod tubes, and when the central tube is slid relative to the base body in the folded state, the supporting component is folded as being close to the tripod tube which is pivotally connected with the supporting component.

5. The tripod as claimed in claim 4, wherein the central tube and the supporting component are pivotally connected by a pivotal connecting element.

6. The tripod as claimed in claim 4, wherein the connecting component and the supporting component are connected to the tripod tube by a fixing element.

7. The tripod as claimed in claim 1, further comprising a plurality of fixing elements, wherein each of the connecting component is further connected to the tripod tube by one of the fixing elements, wherein each of the plurality of connecting components is pivotally connected to the tripod tubes adjacent to each other via screwing onto one of the fixing elements.

8. The tripod as claimed in claim 7, wherein each of the fixing element further comprises two connecting arms, wherein each of the connecting arm connects to one of the connecting components.

9. The tripod as claimed in claim 8, further comprising a central tube and a plurality of supporting components, wherein the plurality of supporting components connects the central tube and the plurality of tripod tubs, and each of the plurality of supporting components connects to one of the plurality of tripod tubs via one of the fixing elements.

10. The tripod as claimed in claim 1, further comprising a central tube, a sliding component and a plurality of guiding components, the central tube is connected with the base body, the sliding component is slidably sleeved by the central tube, and each guiding component is pivotally connected between the sliding component and the tripod tube.

11. The tripod as claimed in claim 1, wherein the tripod tube includes a supporting tube and a sliding tube, the supporting tube is provided with two longitude elements and one lateral connecting element connected to one end of the each longitude elements and situated between the two longitude elements, the lateral connecting element is connected with the base body, and the sliding tube is slidably connected between the two longitude element by a sleeving element.

12. The tripod as claimed in claim 1, wherein the tripod tube is a telescopic tube.

13. The tripod as claimed in claim 1, wherein each the fixing element further comprises two connecting holes, wherein each of the supporting components connects to one of the plurality of the tripod tubs via one of the connecting holes.

14. The tripod as claimed in claim 1, wherein the connecting arms are above the connecting holes.

* * * * *